Figure 1:
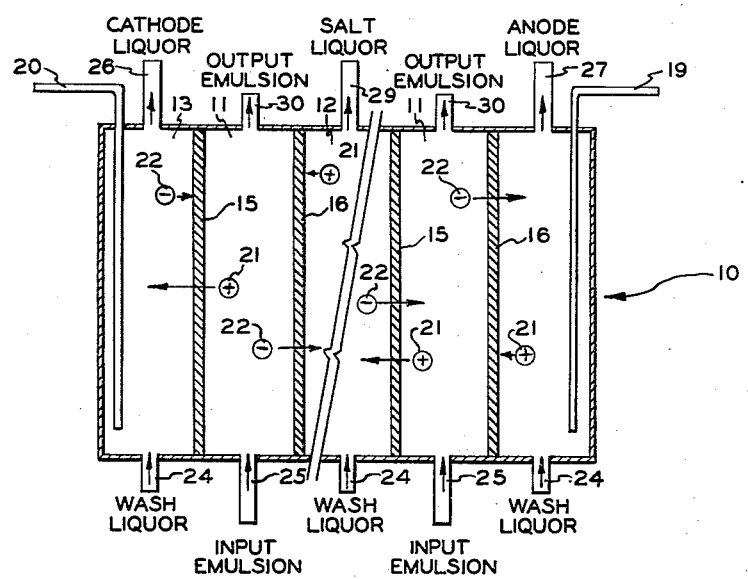

March 18, 1958   J. L. NOBLE   2,827,428
PHOTOGRAPHIC EMULSION PURIFICATION
Filed March 21, 1955

*INVENTOR:*
JOSEPH L. NOBLE
BY
Frank A. Steinilper
ATTORNEY

United States Patent Office 2,827,428
Patented Mar. 18, 1958

2,827,428

PHOTOGRAPHIC EMULSION PURIFICATION

Joseph L. Noble, Rochester, N. Y., assignor, by mesne assignments, to Ionics, Inc., a corporation of Massachusetts Application March 21, 1955, Serial No. 495,526

2 Claims. (Cl. 204—180)

This invention relates in general to the preparation of a photographic photosensitive product and in particular to the purification of a photographic emulsion.

In the preparation of silver halide photosensitive products it is usual to prepare an emulsion base of gelatin or like material in water. To this emulsion base are added silver ions or salts and halide ions or salts to form therein a silver halide gelatin emulsion. The emulsion when thus prepared generally contains, in addition to the silver halides, certain other salt ingredients such as sodium, ammonium, nitrate, excess halide, and like ionic materials which have been incorporated along with the silver halides.

In order to produce a top-quality photographic product having a maximum photographic speed and being free from fog and like defects it is generally necessary to remove selectively these ionic impurities until there remains, in the emulsion, the silver halide together with an optimum amount of ionic and like impurity to produce a photographic product of optimum characteristics. According to present practice the properly purified emulsion is prepared by washing the emulsion with a wash liquid such as water in order to leach out the ionic and water-soluble impurities in the emulsion.

Since the purpose in purification of such an emulsion is to remove water-soluble materials from a base product which in itself can be dissolved or readily suspended in water it is necessary to take specific pains to assure substantial insolubility of the emulsion during the washing operation. Normally this is accomplished by prolonged chilling of the emulsion in order to cause it to jell, whereupon it can be washed with cold water without dissolving or remelting. This, of course, is necessarily a time-consuming procedure since it is necessary to set the emulsion for a relatively long time in order to get it properly solidified, and further since it is necessary to wash the emulsion with cold water while it is in a relatively solid state.

It is, therefore, an object of the present invention to provide new means, methods and apparatus for the purification of a photographic emulsion.

In recent years an art generally known as electrodialysis has been introduced to industrial uses, principally for the purification of brine solutions and the like. According to this new art, purification methods by dialysis have been improved by the application of electric potential which serves as a directing force for the dialysis in combination with selectively permeable membranes which are selectively permeable either to negative ions or anions on the one hand, or to positive ions or cations on the other. As illustrative of this new art, there appears in Chemical Engineering, October 1954, pages 177 to 180, a summary of the art of electrodialysis along with diagrammatic illustrations of the operation of this new art. Briefly, a material to be purified, such as for example brackish water or the like, is fed to one of a series of compartments bounded on one side by a cation permeable membrane and bounded on the other by an anion permeable membrane. While the material being purified is passed through this compartment there is applied an electric potential or an electrolytic current to direct the cations to and through the cation permeable membrane and simultaneously to direct the anions to and through the anion permeable membrane, whereby ions of both polarities are effectively removed from the material.

It is, accordingly, another object of the present invention to provide apparatus, means, and methods for the purification of a silver halide photographic emulsion by means of electrodialysis.

Additional objects of the invention will in part be obvious and will in part appear from the following specification and drawings in which:

Fig. 1 is a diagrammatic illustration of apparatus and method for the purification of a photographic emulsion according to the present invention.

Referring now to Fig. 1 there is illustrated diagrammatically certain process and apparatus suitable for the present invention. According to the figure an ion removal assembly or apparatus 10 has a plurality of compartments comprising a repetitive cycle of emulsion compartments 11 and wash liquor compartments 12, 13 and 14. As many series or cycles of these compartments may be employed as are desired, and commercially available apparatus generally has a large number of such compartments. For example apparatus containing 51 compartments is disclosed as typical in the above cited Chemical Engineering reference. These compartments are divided by semipermeable membranes 15 and 16. One set of these membranes 15 generally comprise cation exchange, semipermeable membranes such as, for example, a cation exchange resin in membrane form or a suitable support material impregnated or coated with a cation-exchange active ingredient. The other series of semipermeable membranes 16 consist of anion exchange semipermeable membranes such as comparable films or membranes of anion exchange resins or supported anion exchange materials. These membranes 15 and 16 are alternated between the compartments so that each compartment or chamber has one type of membrane on one side and the other type of membrane on its other side. Typical compartments and membranes are disclosed in U. S. 2,636,851, such membranes are shown to comprise ion exchange resins having ionic groups with a dissociation constant of at least $10^{-5}$ and being present in an amount at least 0.3 milliequivalent per gram of dry resin, and said water being present in an amount of at least 15% of the weight of the dry resin.

At one end of the series of compartments and positioned within each end compartment is an anode 19 in anode compartment 14 at one end and a cathode 20 in cathode compartment 13 at the other end. Diagrammatically illustrated within the various compartments are positively charged ion particles or cations 21 and negatively charged ion particles or anions 22.

At one edge of the series of compartments, designated for convenience as the input end, are a series of alternating input conduits or tubes 24 and 25, being wash liquor input tubes 24 and emulsion input tubes 25 positioned to supply a wash liquor to alternate compartments and a material being treated to the inbetween compartments. Desirably, both the cathode compartment and the anode compartment are supplied with the wash liquor, thereby calling for an odd number of compartments in the entire assembly.

Leading out from the opposite edge of the compartments, otherwise known as the output end, are a series of tubes or conduits to carry the processed liquids to the appropriate point for use or disposal. As illustrated, there is a cathode output tube 26 and an anode output tube 27 leading respectively from the cathode and anode compartments, a salt liquor output conduit 29 leading from the output end of each of the intermediate wash liquor compartments 12 and an emulsion output conduit 30 leading from each of the emulsion compartments 11.

The use and operation of the apparatus is illustrated in Fig. 1. The photographic emulsion or other material being acted upon for purification or the like is applied to the input emulsion tubes 25 and thereby led through the emulsion compartments 11 and out through the output emulsion tubes 30. Simultaneously, an appropriate wash liquor is fed to the wash liquor tubes 24 into the salt liquor, cathode, and anode compartments 12, 13, and 14 and out through the appropriate output tubes 26, 27, and 29. While these materials are being fed through the apparatus, an operating potential is applied to each of the anodes 19 and the cathode 20. Within the apparatus two simultaneous processes are being carried out. In the first one, the cations 21, being positively charged, are propelled toward the cathode and in doing so strike the anion permeable membranes 16 and the cation permeable membranes 15. When these cations 21 strike the cation permeable membrane 15 they are able to penetrate the membrane and thus enter into the adjacent compartment separated therefrom by this cation permeable membrane. On the other hand, however, when the cations reach the anion permeable membrane they are of improper type to pass therethrough and are held back or retained by the membrane and remain in the original compartment. Similarly, the anions 22 are propelled toward the anode and penetrate through the anion permeable membrane 16 but fail to penetrate through the cation permeable membrane 15. As is apparent by reference to the figure, the result of this is that certain of the compartments, illustrated as being the emulsion compartments 11, are quickly depleted of their anions and cations by virtue of the cations 21 moving toward and penetrating through the cation permeable membrane on one side of the compartment and the anions 22 moving to and penetrating through the anion permeable membrane on the other side of the same compartment. While the compartments 11 are being depleted of their ions it follows necessarily that the compartments 12, 13, and 14 are receiving additional ions from their adjacent neighbors. Thus both cations and anions migrate into the salt liquor compartments 12, coming in the anions from the one side and the cations from the other, while the end compartments 13 and 14 receive solely the cations into cathode compartment 13 and the anions into anode compartment 14. Thus, the output is as follows: From emulsion compartments 11 into which the emulsion or like liquid has been passed the output is a purified or deionized emulsion. From compartments 12 is obtained a salt liquor consisting of the wash liquor with the added cations and anions received from the emulsion compartments on each side thereof. Lastly, the output from the cathode compartment 13 is the cathode liquor consisting of wash liquor with added cation materials, and the output of the anode compartment is the anode liquor consisting of the wash liquor and the added anions.

According to one embodiment of the invention as illustrated in Fig. 1 the apparatus and process are utilized for the purification of a silver halide gelatin emulsion. In general the emulsion forming the input emulsion comprises the mixture of gelatin and emulsion materials in water together with the mixed reaction products of a silver salt such as silver nitrate or the like and a halide salt such as ammonium or potassium bromide or the like. These emulsions have been prepared in the manner and methods which are conventional in the photographic art, such as, for example, mixing together an aqueous emulsion base and solutions of silver nitrate and potassium bromide and ammonium bromide. The emulsion may also contain added ingredients either of non-ionic character or ionic materials which are to be retained or partly retained in the emulsion, or added ingredients of ionic character which have been introduced for some desired purpose and which are to be removed according to the present invention. If desired, gelatin substitutes such as polyvinyl chlorides and alcohols, alginates, zein, cellulose derivatives and the like may be used in place of the gelatin base.

The wash liquor which is fed through wash tubes 24 generally is water which may or may not be distilled or otherwise purified to remove harmful impurities, but which generally contains sufficient quantities of an electrolyte to permit it to carry an electric current. The wash water and the emulsion are passed through the purifying system at a rate and duration of flow and under potentials so adjusted as to produce at the output end an emulsion of the desired degree of purity. The resulting emulsion may be further treated as desired, including having added to it special photographic emulsion ingredients, or may if desired be coated directly onto the emulsion-receiving base such as a film base paper or the like.

The general nature of the invention having been set forth, the following specific examples are presented in illustration but not in limitation of the scope of the invention.

*Example I*

An ionic demineralizer available from Ionics, Inc. and being of the general type described in Chemical Engineering, October 1954, pages 177 to 180, was employed as the purifying apparatus. It generally conforms with the apparatus illustrated in Fig. 1. Into the input emulsion tubes, otherwise known in the art as the input for the material to be purified, was fed a photographic emulsion which had been prepared by conventional photographic techniques. Essentially, the emulsion was prepared by dissolving in water a gelatin base such as a specially purified gelatin as generally available to the photographic art. To this was added appropriate solutions of silver nitrate and ammonium bromide together with other salts as conventionally desired. The emulsion was taken from a conventional production run after the ingredients had been mixed by the usual techniques.

Into the other input feed designed for the wash liquor or the like was fed a 0.2 normal ammonium sulfate wash solution. A 25 volt potential was applied between the anode and cathode and the emulsion solution was cycled an average of 15.6 times through 25 emulsion compartments. The operation was continued for 156 minutes and was discontinued when the pH and resistance of the emulsion were the desired level.

Thereafter, desired and conventional ingredients such as photosensitizing dyes and the like were added to the emulsion and the emulsion was coated on a paper base in the usual manner. The product was tested against a control sample consisting of a like emulsion washed and treated in the usual manner and coated on a similar paper base and was found to be satisfactory according to tests for fog and for photographic speed. In each of these tests it was generally comparable with a product prepared by the conventional production methods.

Having thus disclosed my invention, I claim and desire to secure by Letters Patent:

1. In a method of purifying a photographic emulsion comprising an aqueous suspension of gelatin containing a precipitated photosensitive silver halide and dissolved ionic impurities, the steps comprising passing said emulsion into a first electrolytic chamber bounded on each side by a second and third electrolytic chamber respectively, said second electrolytic chamber being separated from said first electrolytic chamber by a selectively permeable cation membrane and said third electrolytic chamber being separated from said first electrolytic chamber by a selectively permeable anion membrane, said membranes comprising ion exchange resins having ionic groups chemically bonded thereto with a dissociation constant of at least $10^{-5}$ and being present in an amount at least 0.3 milliequivalent per gram of dry resin, and water in gel relationship with said resins being present in an amount of at least 15% of the weight of the dry resin, passing an electrolytic solution into each of said second and third chambers and applying an electric potential between said second and third chambers relatively more negative at the second chamber with respect to the first chamber whereby cation impurities are carried through said cation permeable membrance into said second chamber and anion impurities are carried through said anion permeable membrane into said third chamber.

2. In a method of purifying a gelatin photographic emulsion containing silver halide and dissolved ionic impurities, the steps comprising passing said photographic emulsion into and through a plurality of treating chambers of an electrodialysis unit, each treating chamber having washing chambers on each side thereof and separated from said treating chambers by alternate anion selectively permeable and cation selectively permeable ion exchange membranes, said membranes comprising ion exchange resins having ionic groups chemically bonded thereto with a dissociation constant of at least $10^{-5}$ and being present in an amount at least 0.3 milliequivalent per gram of dry resin, and water in gel relationship with said resins being present in an amount of at least 15% of the weight of the dry resin, passing electrolytically conductive liquors through said washing chambers, and passing a direct electric current in series through the membranes and chambers to effect migration of the ionic impurities in said gelatin photographic emulsion through the membranes into the washing chambers thus effecting purification of said gelatin photographic emulsion.

References Cited in the file of this patent
UNITED STATES PATENTS

| | | |
|---|---|---|
| 1,801,784 | Schwarz | Apr. 21, 1931 |
| 2,694,680 | Katz | Nov. 16, 1954 |